Jan. 22, 1952     W. G. HOFFMAN     2,583,216
VEHICLE WHEEL TRUCK
Filed April 1, 1949     2 SHEETS—SHEET 2
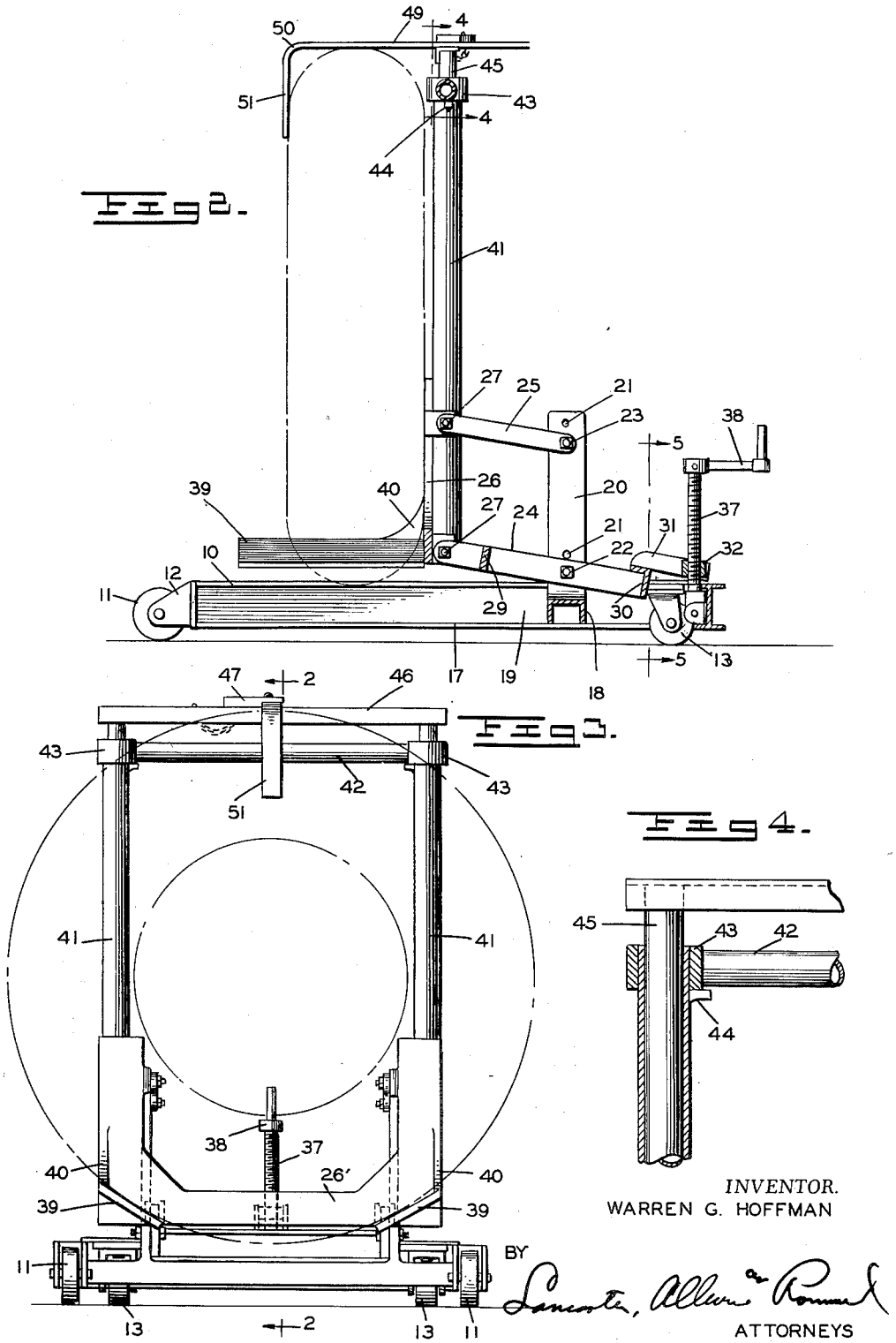
INVENTOR.
WARREN G. HOFFMAN
BY
ATTORNEYS Patented Jan. 22, 1952

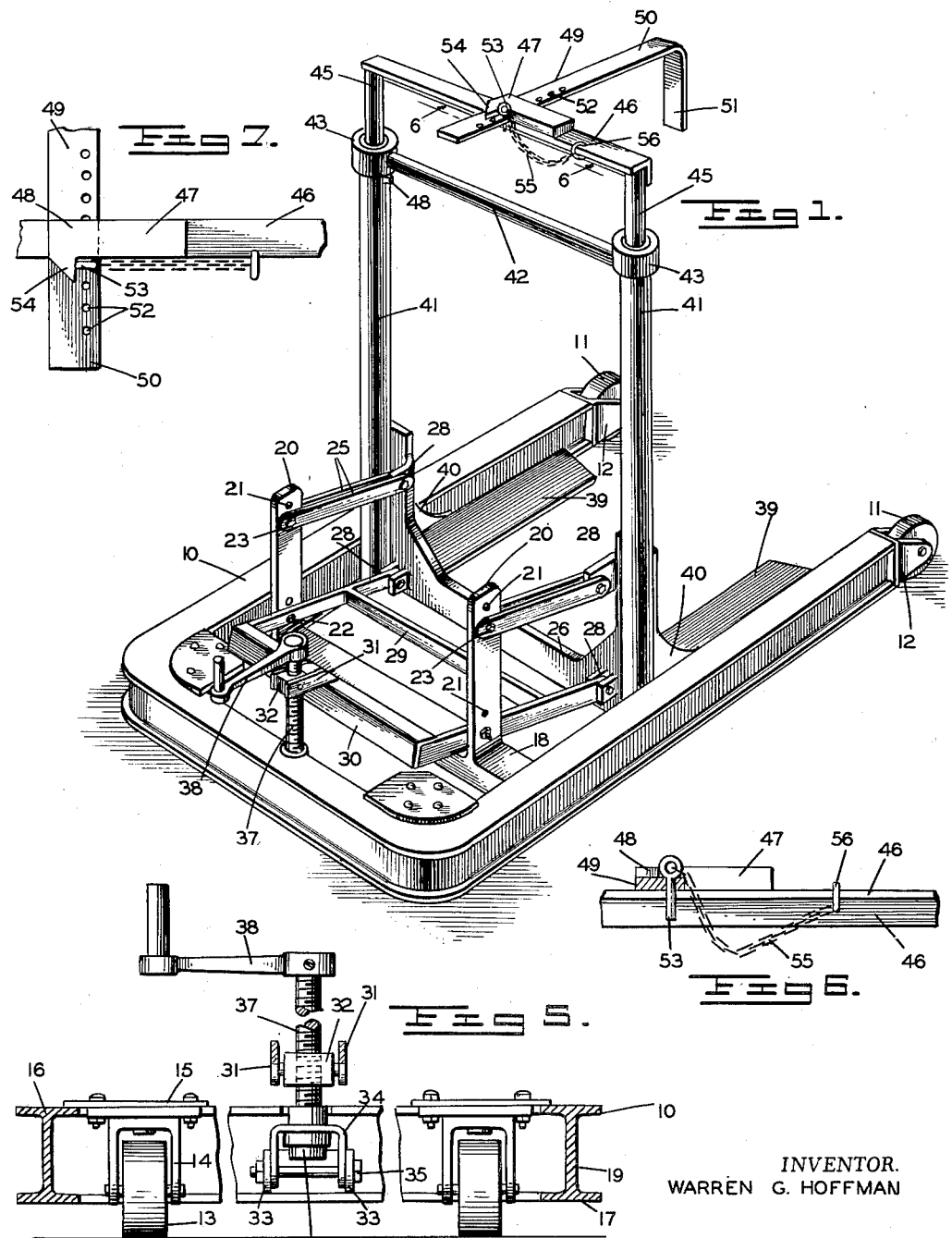

2,583,216

UNITED STATES PATENT OFFICE 2,583,216

VEHICLE WHEEL TRUCK

Warren G. Hoffman, Plainview, Tex., assignor of one-half to James E. White

Application April 1, 1949, Serial No. 84,994

4 Claims. (Cl. 214—1)

This invention relates to vehicle wheel trucks with the particular object of providing such a truck or handler for safer, faster, easier, and better way of handling all tires and wheels, especially large tractor and bus wheels and tires as it eliminates lifting and wrestling with the large wheels and tires, speeds up the work of handling. On heavy dual wheels and tires, the handler makes it easier to line up the hub and brake drum, bearings, grease seals and brake shoes. The handler holds single or dual wheels and tires in upright position, thereby saving time, not having to hunt a support against which to lean them.

Other objects are to provide such a vehicle wheel and tire handler in which the main truck frame is very close to the supporting surface and in which the upper portion of the frame facing the vehicle with respect to which the tire and wheel are to be removed or placed, is open so as to afford ready access to the wheel securing parts and other elements; in which there is provided an assembly for vertically and laterally moving and supporting wheels and tires, that is adjustable for use with a wide range of sizes of wheels and tires; and which embodies improved actuating mechanism on the forward portion of the truck, on the opposite side from the moving and supporting assembly, so arranged as to not interfere with operations on the wheel mounting and other parts of the vehicle.

Further objects, details and advantages of this invention will appear in the following description, supplemented by the accompanying drawings, illustrating a highly practicable embodiment of a vehicle wheel truck in accordance with this invention, and forming a part of this specification.

In the drawings:

Fig. 1 is a perspective view of a vehicle wheel truck in accordance with my invention.

Fig. 2 is a vertical sectional view thereof taken on line 2—2 of Fig. 3.

Fig. 3 is an end elevational view thereof.

Fig. 4 is a fragmentary vertical sectional view, on an enlarged scale, taken on the line 4—4 of Fig. 2.

Fig. 5 is a vertical sectional view thereof taken on the line 5—5 of Fig. 2.

Fig. 6 is a fragmentary vertical sectional view, on an enlarged scale, taken substantially on line 6—6 of Fig. 1.

Fig. 7 is a fragmentary plan view on an enlarged scale of the parts shown in Fig. 6.

The vehicle wheel truck in accordance with this invention, includes a low swung horizontal base frame 10, of generally U-shape, supported at the rear by means of wheels 11 or rollers mounted in bearing bracket 12 extending outward from the free ends of base frame 10, and at the forward end by caster wheels or rollers 13 the castering mountings 14 of which are secured to plates 15 which in turn are secured to the upper surface of the upper flanges 16 at the bends of the frame member. Thus the lower flanges 17 of frame 10 are supported at a low elevation above the floor. The frame 10, as shown, is preferably constructed of a unitary I-beam formation.

Adjacent to the closed end of frame 10 is a channel cross piece 18, the ends of which abut the web 19 and rest on the lower flange 17 of frame 10, where they are secured, as a firm base, for upright standards 20 integrally secured to and extending upwardly from cross piece 18 adjacent to the ends thereof. These standards 20 are each provided with a series of pivot apertures 21 for receiving pivot members 22 and 23 for lever and link elements 24 and 25, respectively, which operate as parallel link connections with an upright U-shaped frame 26 with which their ends are connected by means of pivots 27 consisting of bolts or the like secured to lugs 28 integrally connected with the upright portions of frame 26. Link elements 25 are preferably in pairs, one on each side of each upright 21 and its corresponding lug 28.

Lever elements 24 have an intermediate spacing bar 29 adjacent to their pivotal connections with frame 26, and their other ends are connected with a crosswise extending angle bar 30, to the mid portion of which a pair of outwardly extending brackets 31 are secured. These brackets carry a pivoted nut 32. The intermediate connecting portion of frame 10 has corresponding upwardly projecting brackets 33, and a U-shaped member 34 is pivoted thereto by means of a pivot bolt 35. Member 34 provides a mounting for a swivel member 36 on the lower end of an operating screw 37 which extends upwardly therefrom and is threaded through pivoted nut 32 carried by the end member 30 of the lever elements 24. An operating wheel, or, as may be preferred and shown, a crank 38 is mounted on the upper end of screw 37 and by turning the same the frame 26 may be raised or lowered as desired.

The upright U-shaped frame 26, as stated, is supported in a substantially vertical position by means of the parallel linkage connection, lever and link members 24 and 25 on the support standards 20. The lower portion of frame 26, on the opposite side of this lever and link connection with standards 20, has a pair of wheel, or tire and wheel, lifting bars 39 in the form of inclined platforms extending rearwardly from the sides of frame 26 and integrally connected therewith and preferably reinforced by web elements 40 integrally secured to their outer edges and the outer edge of the upright portions of frame 26. In its lowered position, as shown in Fig. 1, the frame 26 and the lifting bars 39 extend downwardly between the side portions of frame 10 with the lower edges of bars 39 substantially in engagement with the floor so that the truck may be moved into position and so that bars 39 will pass under a wheel and tire forwardly and rearwardly of its engagement with the supporting surface, preferably after the vehicle with the wheel to be removed has been slightly jacked up.

When the wheel has been disconnected from the vehicle, the operating wheel or crank 38 may be turned to elevate the wheel to any desired height. The frame 26 and lifting bars 39, and a wheel, indicated by dot and dash lines, are shown in Figs. 2 and 3, in an elevated position. Frame 26 also has a pair of tubular uprights 41 secured thereto, one adjacent to the outer edge of each upright portion of the frame, and a cross tubular bar 42 adjacent to their upper ends holds them rigidly in their upright positions. Bar 42 has an integral end collar 43 on each of its ends which collars are receivable over the upper ends of upright tubes 41 and a stop 44 on each tube 41 supports the collars 43 at the upper ends of tubes 41 as shown.

In each of these upright tubular members is an extensible tube or bar 45 telescopically received therein so that the tubes or bars may be raised to any desired height to accommodate different sized wheels. The upper ends of these tubes 45 are secured to the ends of a cross bar 46 preferably in the form of an angle bar and to the mid portion of the upper surface of this bar is secured a clamp bracket 47, the end 48 being under cut or recessed for the reception of the horizontal portion 49 of an extensible clamp 50.

The clamp 50 rests on the upper surface of the wheel or tire and wheel and has a downturned end 51 which engages the side portion of the wheel holding the wheel between it and the upright frame 26, standards 41 and associated parts as shown in Fig. 2. Along an edge of the horizontal portion 49 of clamp 50 is a series of apertures 52 into any one of which a pin 53 may be positioned in accordance with the thickness of the tire or wheel the clamp is holding. A prong 54 on clamp bracket 47 engages pin 53 and holds clamp 50 against lateral movement out of the bracket as shown in Figs. 1 and 7. A chain 55 secured to pin 53 and to a ring 56 carried by cross bar 46 prevents loss or misplacement of pin 53 and carries it in ready access for placement in a selected aperture 52 of clamp 50, when the clamp is placed in wheel engaging position.

It will be seen that the vehicle wheel truck as described affords easier handling of wheels than former equipment, placing the operating means for the wheel lifter directly in front of the wheel where it may be operated to adjust the elevation of the wheel with precision, when it is desired to replace a wheel on a vehicle, and yet affording full space through the lifting members for working on the vehicle wheel axle and wheel mounting elements.

I claim:

1. A vehicle wheel truck comprising, a substantially U-shaped frame, wheels mounted on said frame so that it can be moved over a supporting surface, upright standards mounted adjacent to the sides of the frame behind the closed front end thereof, a lever and parallel link connection mounted on each of said standards, with the lever extending forwardly and rearwardly thereof and the link above the lever and rearwardly of the standard, operating means connected between the front ends of the levers and the mid portion of the front end of the U-shaped frame, wheel engaging and lifting means on the rear ends of said parallel link and lever connection comprising, an upright U-shaped frame, a pair of wheel lifting and supporting bars extending rearwardly from said upright U-shaped frame, one at each side of the frame so as to be adjacent to and pass between the ends of the truck frame, extensible uprights extending above the upper ends of said upright U-shaped frame, a bar connected across the upper ends of said extensible uprights, and extensible clamping means carried by the mid portion of the bar across the upper ends of said uprights for engaging the top of a wheel supported on said wheel lifting and supporting bars.

2. A vehicle wheel truck comprising, a substantially U-shaped frame, wheels mounted on said frame so that it can be moved over a supporting surface, upright standards mounted adjacent to the sides of the frame behind the closed front end thereof, a lever and parallel link connection mounted on each of said standards, with the lever extending forwardly and rearwardly thereof and the link above the lever and rearwardly of the standard, operating means connected between the front ends of the levers and the mid portion of the front end of the U-shaped frame, and wheel engaging and lifting means on the rear ends of said parallel link and lever connection comprising, an upright U-shaped frame, a pair of wheel lifting and supporting bars extending rearwardly from said frame, one at each side of the frame so as to be adjacent to and pass between the ends of the truck frame, an upright tubular member secured to each of the upright sides of said upright U-shaped frame, upright members telescopically received in said upright tubular members so as to be adjustably extended therefrom, a bar connected across the upper ends of said upright members, and a wheel engaging clamp carried by said bar for engaging the upper portion of a wheel supported on said wheel lifting and supporting bars.

3. A vehicle wheel truck comprising, a substantially U-shaped frame, wheels mounted on said frame so that it can be moved over a supporting surface, upright standards mounted adjacent to the sides of the frame behind the closed front end thereof, a lever and parallel link connection mounted on each of said standards, with the lever extending forwardly and rearwardly thereof and the link above the lever and rearwardly of the standard, operating means connected between the front ends of the levers and the mid portion of the front end of the U-shaped frame, and wheel engaging and lifting means on the rear ends of said parallel link and lever connection comprising, an upright U-shaped frame, a pair of wheel lifting and supporting bars extending rearwardly from said frame, one at each side of the frame so as to be adjacent to and pass between the ends of the truck frame, an upright tubular member secured to each of the upright sides of said upright U-shaped frame, upright members telescopically received in said upright tubular members so as to be adjustably extended therefrom, a bar connected across the upper ends of said upright members, a clamp engaging bracket mounted on said bar, and a wheel engaging clamp carried by said clamp engaging bracket for engaging the upper portion of a wheel supported on said wheel lifting and supporting bars, said clamp comprising a longitudinal bar having a downwardly extending end portion for engaging the side of a wheel, and means for adjustably securing the horizontal portion of said bar in said clamp engaging bracket so as to position the downwardly extending portion of the clamp at varying distances from the bracket in accordance with the size of the wheel carried by the wheel lifting and supporting bars.

4. A vehicle wheel truck comprising, a substantially U-shaped frame, wheels mounted on said frame so that it can be moved over a supporting surface, upright standards mounted adjacent to the sides of the frame behind the closed front end thereof, a lever and parallel link connection mounted on each of said standards, with the lever extending forwardly and rearwardly thereof and the link above the lever and rearwardly of the standard, operating means connected between the front ends of the levers and the mid portion of the front end of the U-shaped frame, and wheel engaging and lifting means on the rear ends of said parallel link and lever connection comprising, an upright U-shaped frame, a pair of wheel lifting and supporting bars extending rearwardly from said frame, one at each side of the frame so as to be adjacent to and pass between the ends of the truck frame, an upright tubular member secured to each of the upright sides of said upright U-shaped frame, upright members telescopically received in said upright tubular members so as to be adjustably extended therefrom, a bar connected across the upper ends of said upright members, a clamp engaging bracket mounted on said bar, and a wheel engaging clamp carried by said clamp engaging bracket for engaging the upper portion of a wheel supported on said wheel lifting and supporting bars, said clamp comprising a longitudinal bar having a downwardly extending end portion for engaging the side of a wheel, and means for adjustably securing the horizontal portion of said bar in said clamp engaging bracket so as to position the downwardly extending portion of the clamp at varying distances from the bracket in accordance with the size of the wheel carried by the wheel lifting and supporting bars, comprising a series of apertures in the bar lengthwise thereof and a pin for selectively engaging any one of said apertures and the clamp engaging bracket.

WARREN G. HOFFMAN.

REFERENCES CITED

The following references are of record in the file of this patent:

UNITED STATES PATENTS

| Number | Name | Date |
| --- | --- | --- |
| 1,171,808 | Siberell | Feb. 15, 1916 |
| 1,523,486 | Manley | Jan. 20, 1925 |
| 1,650,810 | Weaver | Nov. 29, 1927 |
| 1,843,968 | Bellows | Feb. 9, 1932 |
| 1,847,382 | Collins | Mar. 1, 1932 |